(12) United States Patent
Ahmed et al.

(10) Patent No.: US 12,179,434 B1
(45) Date of Patent: Dec. 31, 2024

(54) METHOD AND SYSTEM FOR INTEGRATING REAL-TIME MONITORING AND INTEGRITY DIAGNOSIS INTO COMPONENT MANUFACTURING

(71) Applicant: United Arab Emirates University, Al Ain (AE)

(72) Inventors: Waleed Ahmed, Al Ain (AE); Muthanna Aziz, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/637,969

(22) Filed: Apr. 17, 2024

(51) Int. Cl.
| | |
|---|---|
| *B29C 64/393* | (2017.01) |
| *B29C 64/336* | (2017.01) |
| *B33Y 50/02* | (2015.01) |
| *G06F 30/23* | (2020.01) |
| *G06F 30/27* | (2020.01) |
| *G06F 113/10* | (2020.01) |
| *G06F 119/02* | (2020.01) |

(52) U.S. Cl.
CPC ............ *B29C 64/393* (2017.08); *B33Y 50/02* (2014.12); *G06F 30/23* (2020.01); *G06F 30/27* (2020.01); *G06F 2113/10* (2020.01); *G06F 2119/02* (2020.01)

(58) Field of Classification Search
CPC ..... B29C 64/336; B29C 64/393; B33Y 50/02; G06F 30/23; G06F 30/27; G06F 2119/02; G06F 2113/10
See application file for complete search history.

(56) References Cited

U.S. PATENT DOCUMENTS

| | | | | |
|---|---|---|---|---|
| 2015/0331402 A1* | 11/2015 | Lin | ................. | G05B 15/02 |
| | | | | 700/119 |
| 2017/0284876 A1* | 10/2017 | Moorlag | .................. | H01B 1/22 |
| 2019/0346313 A1* | 11/2019 | Cox | ....................... | B33Y 10/00 |
| 2021/0060863 A1* | 3/2021 | Rudolph | .................. | B29B 7/36 |
| 2023/0036241 A1* | 2/2023 | Gudkov | ............... | B29C 64/106 |

(Continued)

FOREIGN PATENT DOCUMENTS

WO  WO-2020215093 A1 * 10/2020 ............. B22F 10/30

*Primary Examiner* — Robert B Davis
(74) *Attorney, Agent, or Firm* — MH2 Technology Law Group, LLP

(57) ABSTRACT

There is disclosed an improved additive manufacturing method and system for the production of components and structures, which integrates real-time monitoring and integrity diagnosis systems directly into the manufacturing process. The method introduces smart slicing technique by which smart sensor network layers (SNL) are embedded into sliced layers of a 3-D model at critical points during component design. The critical points are identified by structural analyses of the component using Finite Element Analysis (FEA). A Smart Extrusion and Mixing Module (SEMM) produces both primary printing material and conductive material for SNL layers. The SEMM operates in a direct extrusion mode for primary material and in a mixing and extrusion mode for conductive material. An Artificial Intelligence Single Board Computer (AISBC) manages the printing process and communication with SNL layers. Defect detection occurs in real-time during manufacturing, aided by a scanning module powered by an AI algorithm.

20 Claims, 12 Drawing Sheets

(56) References Cited

U.S. PATENT DOCUMENTS

| | | | |
|---|---|---|---|
| 2023/0158745 A1* | 5/2023 | Lan | B33Y 40/00 |
| | | | 264/494 |
| 2023/0226771 A1* | 7/2023 | Jones | B29C 64/194 |
| | | | 700/118 |
| 2024/0117782 A1* | 4/2024 | Hundley | F02K 9/72 |

* cited by examiner

METHOD AND SYSTEM FOR INTEGRATING REAL-TIME MONITORING AND INTEGRITY DIAGNOSIS INTO COMPONENT MANUFACTURING

FIELD OF THE INVENTION

The present invention relates to the field of additive manufacturing for components, and more particularly an improved additive manufacturing technique and system for embedding real-time monitoring and integrity diagnosis directly into the manufacturing process.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Conventional manufacturing processes have served the industrial sectors well, but they come with inherent challenges, one is the need for regular and often labor-intensive periodic inspections to avoid failure. These inspections are vital for ensuring the structural integrity and safety of manufactured components, especially of the aerospace components and spacecraft structures, but they also consume substantial time, effort, and financial resources. As a result, there has been a growing imperative to develop innovative solutions to streamline manufacturing and maintenance processes while enhancing safety and reducing costs.

Due to extreme operating conditions in many industries, for eg; the aerospace industry, the structural components must meet stringent safety and quality standards. Compliance with strict manufacturing standards is non-negotiable in the aerospace sector, where precision and reliability are paramount. In general, conventional manufacturing processes often require labor-intensive periodic inspections, which can be time-consuming, costly, and resource-intensive. During the manufacturing of aerospace components, quality control is essential to ensure that aerospace components are manufactured to precise specifications and meet stringent quality standards is an ongoing challenge. The aerospace industry parts must operate in extreme conditions, so even minor defects can have catastrophic consequences. However, materials should be inspected for the aerospace components that must meet exacting standards. Certifying that materials are free from impurities and defects is critical to the certification process. Complex aerospace components require high levels of precision, so the challenge lies in maintaining this precision throughout the manufacturing process, especially for complex and sophisticated parts. In aerospace industries, rigorous testing and validation are necessary to ensure the safety and reliability of aerospace components. The challenge is developing and executing tests that accurately represent real-world conditions and cover potential issues rather than using conventional methods. Furthermore, balancing the need for safety and quality with cost-efficiency is an ongoing challenge. Producing components that meet strict standards can be costly, and manufacturers must strive for cost-effective solutions without compromising safety.

Additive manufacturing (AM), commonly known as 3D printing, has emerged as a transformative technology in the aerospace industry. Its customized layer-by-layer approach to building complex structures offers significant advantages, including reduced material waste, cost and the ability to create intricate geometries or highly optimized lighter parts. While additive manufacturing offers advantages, the need for quality control and post-production inspections has been a persistent challenge, as defects and issues might not become apparent until after manufacturing is completed. In an industry such as aerospace with stringent regulations regarding the safety and reliability of produced parts, AM technique is limited by constraints related to the reliability, safety, integrity and trustability of the produced parts and structures due to the nature of the 3D printing technique in successive layers. Therefore, it is highly imperative to conduct ongoing inspections and quality control checks to ensure that each layer is appropriately printed and the final product meets the safety standards.

Also, many concerns are associated with the aerospace components under actual operation conditions. In fact, many aerospace components are part of aging aircraft that have been in service for years. To ensure that these components continued safety and airworthiness as they age is a significant challenge. Regular inspections are necessary, and in some cases, components must be replaced or refurbished. Besides, routine maintenance and inspections are crucial for aircraft safety. The challenge is to schedule and conduct these inspections without causing significant operational disruptions or downtime. Aerospace components are exposed to various environmental stressors, such as temperature fluctuations, pressure changes, and turbulence. Over time, these stressors can impact the structural integrity of components. Besides, collecting and analyzing data from various components and systems is essential during operation. The challenge is managing and interpreting vast amounts of data to detect potential issues and make informed decisions. In addition, ongoing compliance with evolving regulatory standards is a perpetual challenge. Regulations can change over time, and aerospace operators must stay current and implement these changes effectively.

Therefore, safety and inspection challenges in the aerospace industry during manufacturing and operation are fundamental to maintaining the highest safety and reliability standards. These challenges are comprehensive and intrinsic to an industry where precision, quality, and safety is vital. Proactive monitoring and preventive maintenance level is essential in aerospace, mainly when applied to space missions. High safety standards and zero-defect tolerance are paramount, as any failure can have catastrophic consequences. There is risk of mission failure and safety breaches if potential issues are not monitored and addressed before they become critical. Addressing these challenges involves a collaborative effort among manufacturers, operators, regulatory bodies, and technology providers. The aerospace industry must continually invest in research, development, and innovation to enhance safety and inspection procedures. This includes adopting advanced inspection technologies, improving data analytics, and adhering to rigorous quality control standards.

Based on the above explained, there exists a need for a real-time monitoring and integrity diagnosis system for components, especially for aerospace and spacecraft structures and components and a method of manufacturing such systems, which overcomes the drawbacks of the traditionally employed systems.

SUMMARY OF THE INVENTION

Therefore it is an object of the present invention to propose an improved additive manufacturing technique and system for manufacturing components and structures, which involves embedding real-time monitoring and integrity diagnosis systems comprising sensors, data collection mechanisms, and artificial intelligence (AI) algorithms directly into the manufacturing process. The methodology thereby, eliminates the need for periodic inspection processes that should be done to the structural components. The invention is specifically suitable for, but not limited to aerospace and spacecraft structures and components.

There is disclosed a method for additive manufacturing of a component under real-time monitoring capabilities, comprising integrating smart sensor network layers (SNL) directly into sliced layers of a 3-D model of the component at predefined critical points; producing both a primary printing material and a conductive material for the SNL layers during the printing process using a Smart Extrusion and Mixing Module (SEMM); and scanning each printed layer to detect and address defects and irregularities in real-time during manufacturing, wherein producing the conductive material for printing the SNL layers comprises pre-heating plastic pellets to a specified temperature, coating the heated pellets with conductive particles at a consistent coating ratio for an optimized coverage of the conductive particles over the pellets, and further mixing these coated pellets uniformly in the SEMM.

There is disclosed a system for additive manufacturing of the component under real-time monitoring capabilities, comprising a smart slicer configured for embedding smart sensor network layers (SNL) directly into sliced layers of a 3-D model of the component at predefined critical points; a Smart Extrusion and Mixing Module (SEMM) configured to produce both a primary printing material and a conductive material for the SNL layers during a printing process; and a scanning module for scanning each printed layer to detect and address defects and irregularities in real-time during manufacturing, wherein an injection system is configured for coating plastic pellets which are pre-heated to a specified temperature, with conductive particles at a consistent ratio for an optimized coverage of conductive particles over the pellets and, wherein the SEMM is configured for uniformly mixing the pellets coated with conductive particles to produce the conductive material used for printing the SNL layers.

In an embodiment of the present invention, a Finite Element Analysis (FEA) is conducted on the 3-D model of the component prior to smart slicing, for identifying the critical points, vulnerable to high stresses and potential failure, when the component is in actual operation.

In an embodiment of the present invention, an Artificial Intelligence Single Board Computer (AISBC) is configured to oversee and manage the printing process and communication with the SNL layers.

The AISBC is further configured to examine if a layer to be printed is the SNL or not, during the printing process.

According to the invention, the SEMM further comprises a main extrusion unit (MAE) for extruding the primary printing material when the SEMM operates in a direct extrusion mode (DEM) and an auxiliary extrusion unit (AEU) for mixing and extruding the conductive material when the SEMM operates in a mixing and extrusion mode.

In an embodiment of the present invention, the SEMM operates in the mixing and extrusion mode, to produce the conductive material for printing a layer, if the AISBC identifies the layer to be the SNL.

The SEMM is provided with mixing quality sensors, in an embodiment for monitoring the uniformity of the conductive material produced by mixing of the pre-heated plastic pellets coated with the conductive particles in the auxiliary extrusion unit (AEU).

In another embodiment of the present invention, the SEMM operates in the direct extrusion mode, to produce the primary material for printing a layer, if the AISBC identifies the layer not to be the SNL.

The disclosed system provides a scanning module further comprising a structural light scanning camera and a trained Machine Learning (ML) algorithm to detect irregularities or defects as they are built, ensuring all layers are printed correctly.

In an embodiment of the proposed system, the injection system comprises an injector for spraying the conductive particles on to the plastic pellets. The pellets are pre-heated to 50% of its melting point to ensure that the conductive particles are coated over the pellets surface to maintain a consistent mixing ratio during mixing process in the auxiliary extrusion unit.

The method proposes pre-heating the plastic pellets by hot air to 50% of its melting point to ensure that the conductive particles are coated over the pellets surface before entering the SEMM. This is to maintain a consistent mixing ratio when the coated pellets is mixed in the auxiliary extrusion unit in the SEMM for producing the conductive material.

In an embodiment of the invention, the proposed system is integrated with a conventional multi-axis motion system or a conventional 3-D printing infrastructure of any scale, without any replacement of these systems.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
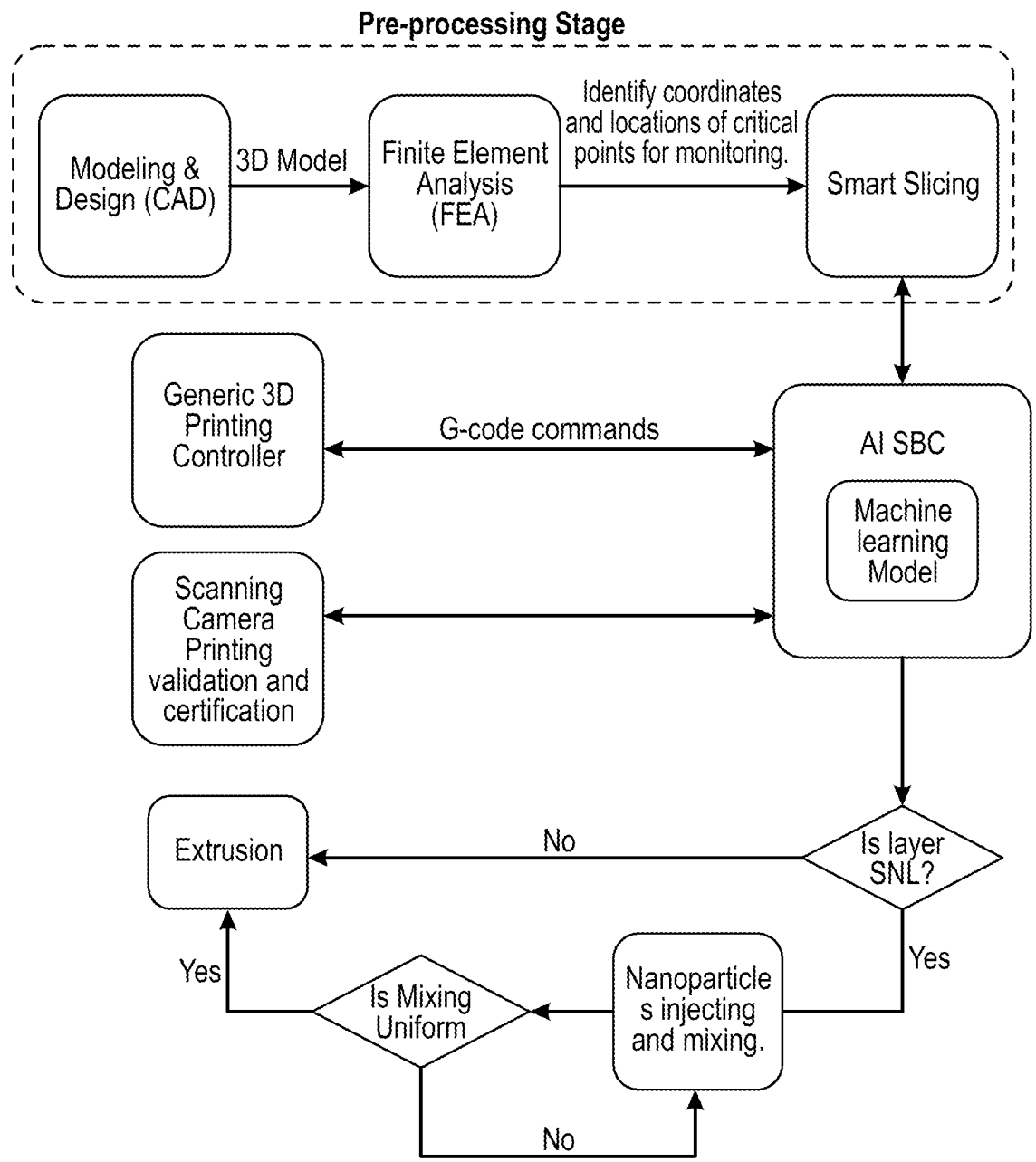
FIG. 1 shows the manufacturing process workflow, in accordance with the present invention.

The aspects of the proposed additive manufacturing method integrating real-time monitoring and integrity diagnosis system—according to the present invention will be described in conjunction with FIGS. 1-8. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes an improved additive manufacturing (AM) technique for manufacturing components and structures, incorporating an advanced real-time monitoring and integrity diagnosis system directly into the additive manufacturing process. The resulting components provide accurate real-time condition information and are analysed using an Artificial Intelligence algorithm to detect abnormalities and predict potential failures of the monitored components, thereby eliminating the periodic inspection processes that should be done to the structural components. The manufacturing technique integrates an AI system that analyses each manufacturing process to ensure compliance with strict manufacturing standards. By embedding sensors, data collection mechanisms, and artificial intelligence (AI) algorithms directly into the manufacturing process, it becomes possible to detect and address defects as they occur during the process. In an embodiment of the invention, the proposed system and method is integrated with the existing conventional production system using 3D printing technology as an upgrade, without interfering with the original functionality or performance.

The invention discloses an enhanced 3D printing technique for fabricating components under real-time monitoring capabilities. A new slicing method for 3D printing, called smart slicing is introduced which embeds smart sensor network layers directly into the sliced layers of the 3-D component model. These layers are strategically positioned at locations predefined based on a simulation-based preventive analysis done using Finite Element (FE) approach, to optimize real-time monitoring for the components. They prompt precautionary alerts when monitored points are overloaded or indicate potential failure concerns. There is a customized extrusion and mixing module capable of producing the primary printing material, besides having an auxiliary mixing material module that produces a conductive material for the system for printing sensing networks. The conductive material is produced by coating plastic pellets with conductive particles, which is then subjected to a uniform mixing in the auxiliary mixing module. The coating process for the supplied plastic pellets involves pre-heating pellets with identified hot air temperature to optimize the coating process for full coverage of conductive particles across the entire surface of the pellets. This results in maintaining a consistent mixing ratio of conductive powder-coated pellets during mixing process, ensuring quality control of the mixing process and, consequently, the sensing network. An AI real-time single board computer (AISBC) oversees and manages the printing process and SNL layer communication. The AISBC examines each layer to be printed and directs the extrusion module to operate in a suitable mode for meeting layer-specific requirements.

The system also includes a scanning module powered by an Artificial Intelligence (AI) algorithm. This module scans and documents each printed layer, employing a Machine Learning (ML) algorithm to identify irregularities or defects. By ensuring the accuracy of all the printed layers, the system ensures compliance with the strict international standards and certifications required by the various industrial sectors like the aerospace. The invention disclosed is feasible, adaptable, and cost-effective since it can be incorporated into any conventional 3D printing infrastructure, and it enables the production of complex designs and shapes without any restrictions on size or shape. The system is further capable of monitoring the components based on a former design and simulation that is considered a reference for actual operating conditions. This capability enables the system to trigger alarms as a precaution to prevent any unpredictable failure or safety issues.

The resultant components manufactured by the disclosed method, are incorporated with advanced condition monitoring capabilities, complete with sensors and data collection mechanisms. These components continuously gather and transmit data regarding their condition, thereby creating a dynamic information feedback loop. This real-time data stream furnishes a comprehensive insight into the component health and performance throughout its operational lifespan. The collected data is further actively analysed using Artificial Intelligence (AI) algorithms. These algorithms possess the ability to identify anomalies and early indicators of potential problems based on the continuous data stream. They can recognize patterns and deviations indicating wear, stress, or other factors affecting the component integrity. Through AI-powered analysis, the system can diagnose and forecast potential failures or risks.

With the proposed system, it is possible to continuously monitor the quality and integrity of the components as they are being built. It can serve as a preventive maintenance technique by proactively identifying and addressing issues in real-time at an early stage itself, without being escalated to a critical failure level. There is no need for post-production inspections, thereby saving time and resources. This proactive approach enhances safety and integrity of components, crucial in industries with high safety standards and zero-defect tolerance. Assessing structure conditions prolongs operational lifetimes, promoting sustainability and reducing environmental impact by minimizing scrapped components. This advancement aligns with the industry goals of achieving higher safety, operational reliability, and environmental sustainability in producing and maintaining structures and components.

The invention is significant for, but not limited to manufacturing aerospace and spacecraft components and structures. It overtakes the constraints of conventional 3D printing technologies in relation to safety and reliability concerns in the aerospace field, especially structural monitoring, early diagnosis alerts, and certifications. The proposed method and system prolong the estimated operation life of the aerospace components due to integrated real-time monitoring and diagnosis features that identify the critical points in the structure to take the right decisions and actions ahead to maintain safety and provide the necessary maintenance at the right time instead of facing disasters or replacing the components before the end of the estimated operation lifetime. This will reduce cost, prolong the life of the components, and improve safety levels for better reliability and sustainability in the aerospace industry. The system can be integrated with the existing conventional production system as an upgrade, enabling the next-generation production of smart monitored aerospace components.

The system and method presented herein address the aforementioned concerns of existing additive manufacturing method through a new additive manufacturing (AM) technique, ensuring the safety and reliability of the produced components in two phases. Initially, each printed layer undergoes validation and certification through scanning, where a Machine Learning (ML) algorithm analyzes scanned images to detect any irregularities and confirm defect-free layers. Subsequently, smart sensor network layers are embedded at predetermined locations to provide real-time monitoring and early fault prediction mechanism, preempting potential serious issues.

The system as in the present invention, is designed in such a way that it doesn't require a complete replacement of manufacturing infrastructure. It uses a modular approach by which it is seamlessly integrated with existing 3D printing infrastructure, serving as an upgrade. This design strategy offers several advantages: (1) Cost reduction by upgrading existing infrastructure instead of complete replacement; (2) Simplified implementation and reduced resource and time requirements, promoting technology adoption; (3) Mitigation of environmental concerns by utilizing existing systems, thereby minimizing waste and natural resource depletion. Despite introducing an upgraded AM technique, the invention also maintains backward compatibility with conventional 3D printing technologies and there is no need to establish new facilities from scratch. This approach ensures that existing manufacturing processes remain unaffected by the new direction, resulting in additional cost savings.

The proposed invention discloses a system and method for manufacturing the next generation of smart components using an additive manufacturing (AM) technique wherein, the method involves designing and building customized modular hardware and software components that can be integrated into existing conventional AM manufacturing systems and infrastructure. This serves as an upgrade to the existing systems rather than replacing it and would save cost as well. The present invention proposes a system and a method that enables fabricating components and structures with embedded real-time monitoring and integrity diagnosis capabilities by embedding smart Sensors Network Layers (SNL) during component fabrication in predefined critical points identified during Finite element Analysis (FEA). The system and methodology is particularly suitable for aerospace and spacecraft component manufacturing.

FIG. 1 demonstrates the process workflow for manufacturing components with embedded monitoring and diagnosis systems. According to the invention proposed, the process starts with a Pre-processing stage, wherein the component to be manufactured is modelled and designed using a Computer-Aided Design (CAD) software, the 3-D model then undergoes a Finite Element Analysis (FEA) to identify the co-ordinates and locations of critical points or potential failure points to be monitored, and the analysed 3-D model is split by Smart Slicer into thin horizontal layers for embedding Sensors Network Layers (SNL) layers into the sliced model in the previously defined critical locations. The Pre-processing stage is followed by In-processing stage where the fabrication process of the component takes place. An AI real-time single board computer (AISBC) receives the sliced model for 3-D printing. The printing process is synchronized by a generic 3D printing controller and a Smart Extrusion and Mixing Module (SEMM), controlled by the AISBC. The printing process involves the AISBC examining if a layer is SNL or not. If it is an SNL, it operates the SEMM to produce the required conductive material by injecting and mixing conductive nanoparticles with the primary printing material (raw material). The mixing process is rigorous and repeated till a uniform conductive material is produced for extrusion. If not SNL, SEMM will run in single extrusion mode, which is the primary material extrusion process. The AISBC is in communication with the printing controller using the G-code commands, to manage the printing process using the extruded material. Each printed layer is validated and certified by scanning using a structural scanning camera and by employing a trained Machine Learning (ML) model to detect irregularities or defects, ensuring that all layers are printed correctly.

In an embodiment of the invention, the components are fabricated by an additive manufacturing process involving a Pre-processing, In-Processing and Post-processing stage. The Pre-processing stage comprises various steps. The first step of this stage is Modeling & Design step, wherein a modular component is modelled and designed based on the requirements and constraints, using Computer-Aided Design (CAD) software. This step involves integrating sensors directly into the CAD model, thereby enabling a real-time monitoring and analysis of critical performance metrics and ensuring continuous assessment of component health throughout its operational lifespan. This intentional integration of sensors throughout the component architecture during the CAD modelling phase, thus helps to achieve an enhanced comprehensive and real-time health monitoring capabilities of fabricated components.

The second step is Finite Element Analysis (FEA) of component to determine the critical points for monitoring. In this step, the designed 3D model of the component is analyzed by simulation through the Finite Element (FE) approach. FEA enables to conduct detailed structural analyses of components for identifying critical points to stress, strain, and deformation. By leveraging this data, the system can establish precise monitoring criteria to detect abnormalities or potential failure points during manufacturing. The critical points identified in the component reflect the high stresses where possible failure could initiate and propagate during the operation of the component. Additionally, FEA provides insights into the structural behaviour of components under various loading conditions, allowing for the optimization of design parameters to enhance performance and durability of components. This iterative optimization process ensures that components are monitored for quality and designed to withstand operational stresses and environmental conditions. The analysis can be static or dynamic based on the component loading conditions.

Figure 2:
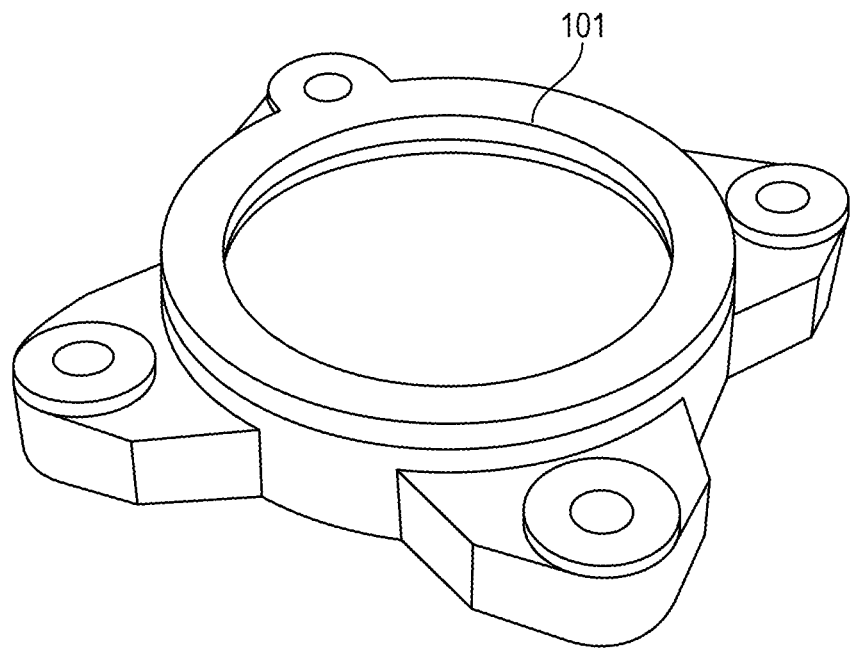
FIG. 2 shows Smart slicing process for the sensing networks, in accordance with the present invention.
Figure 2:
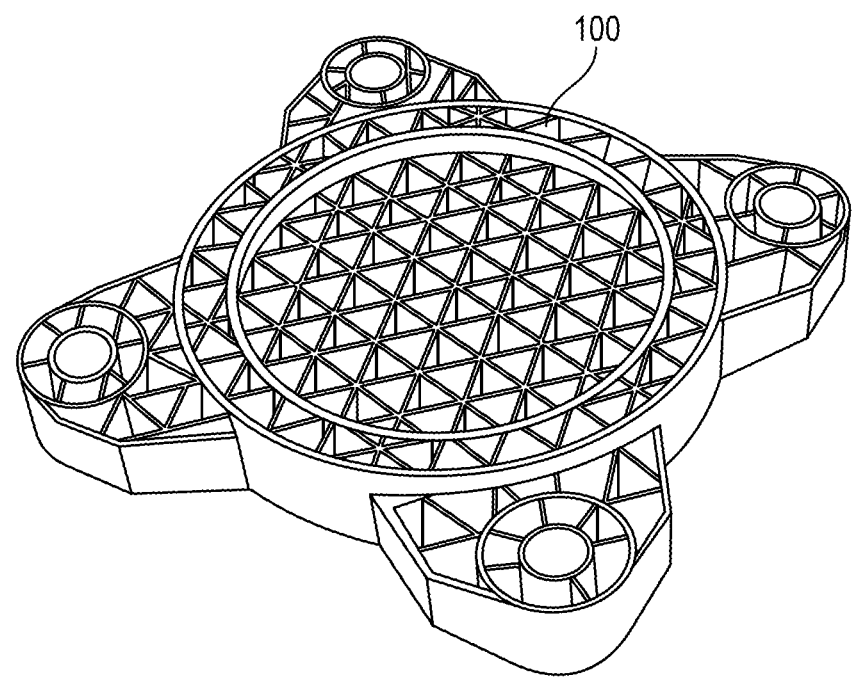

The third step of the AM process or method is slicing the 3D model using a Smart Slicing that embeds sensing networks into the sliced model. The proposed smart slicing method integrates real-time monitoring capabilities directly into the fabrication process. A 3D model slicing involves splitting a model into successive thin horizontal layers. According to the invention, the smart slicing method takes the 3D model slicing further by embedding Sensors Network Layers (SNL) layers into the sliced model in the previously defined critical locations within the component identified in the simulation process. The sliced model is then transferred from the smart slicer to a smart controller for processing. FIG. 2 shows smart slicing process for the sensing networks where 100 represents a smart sliced 3-D model of a component with SNL layer marked and 101 represents the final 3-D product with the embedded SNL layer. The smart slicing method enables a seamless integration of sensing network layers into the additive manufacturing process, eliminating the need for additional assembly steps or post-processing. Key performance metrics of the components, such as stress, strain, and temperature, are continuously monitored by the SNL layers ensuring early detection of abnormalities or potential failure points during manufacturing. With strategic placement of sensing network layers in the sliced model, the invention achieves real-time monitoring and quality assurance in additive manufacturing processes, leading to an improved functionality, reliability, and efficiency of fabricated components.

In an embodiment of the invention, the method of additive manufacturing process involves an In-processing stage, following the Pre-processing stage. This stage is responsible for fabricating the component using a Smart Extrusion and Mixing Module (SEMM), wherein an Artificial Intelligence Single Board Computer (AISBC) oversees and manages the printing process and the communication with the SNL layers. The SEMM is configured to produce both the primary printing material and the conductive material for the SNL layers by operating in different modes. During the fabrication process, the AISBC receives the sliced model from the smart slicer with all SNL layers marked and identified. The AISBC then oversees and manages the printing process by commanding a generic 3D printing controller and the Smart Extrusion and Mixing Module (SEMM) to synchronize the printing process. The AISBC is configured to examine if a layer is SNL or not. If it is an SNL, it operates the SEMM in mixing and extrusion mode, producing the required conductive material. Otherwise, it will run in single extrusion mode, which is the primary material extrusion process. The AISBC is in communication with the printing controller using G-code commands, to manage the printing process.

In an embodiment of the invention, the AI Single Board Computer (AISBC) is a High-Performance Single Board Computer (SBC) comprising the Jetson Xavier. The Jetson Xavier is a small form factor and power-efficient single-board computer (SBC), that enables accurate, multi-modal AI inference. Specification for the SBC can be CPU: 6-core NVIDIA Carmel ARM®v8.2 64-bit CPU 6 MB L2+4 MB L3 Cache, GPU: NVIDIA Volta architecture with 384 NVIDIA CUDA® cores and 48 Tensor cores, RAM: 8 GB 128-bit LPDDR4x @ 51.2 GB/s, AI Performance: 6 TFLOPS (FP16), 21 TOPS (INT8).

Figure 3A:
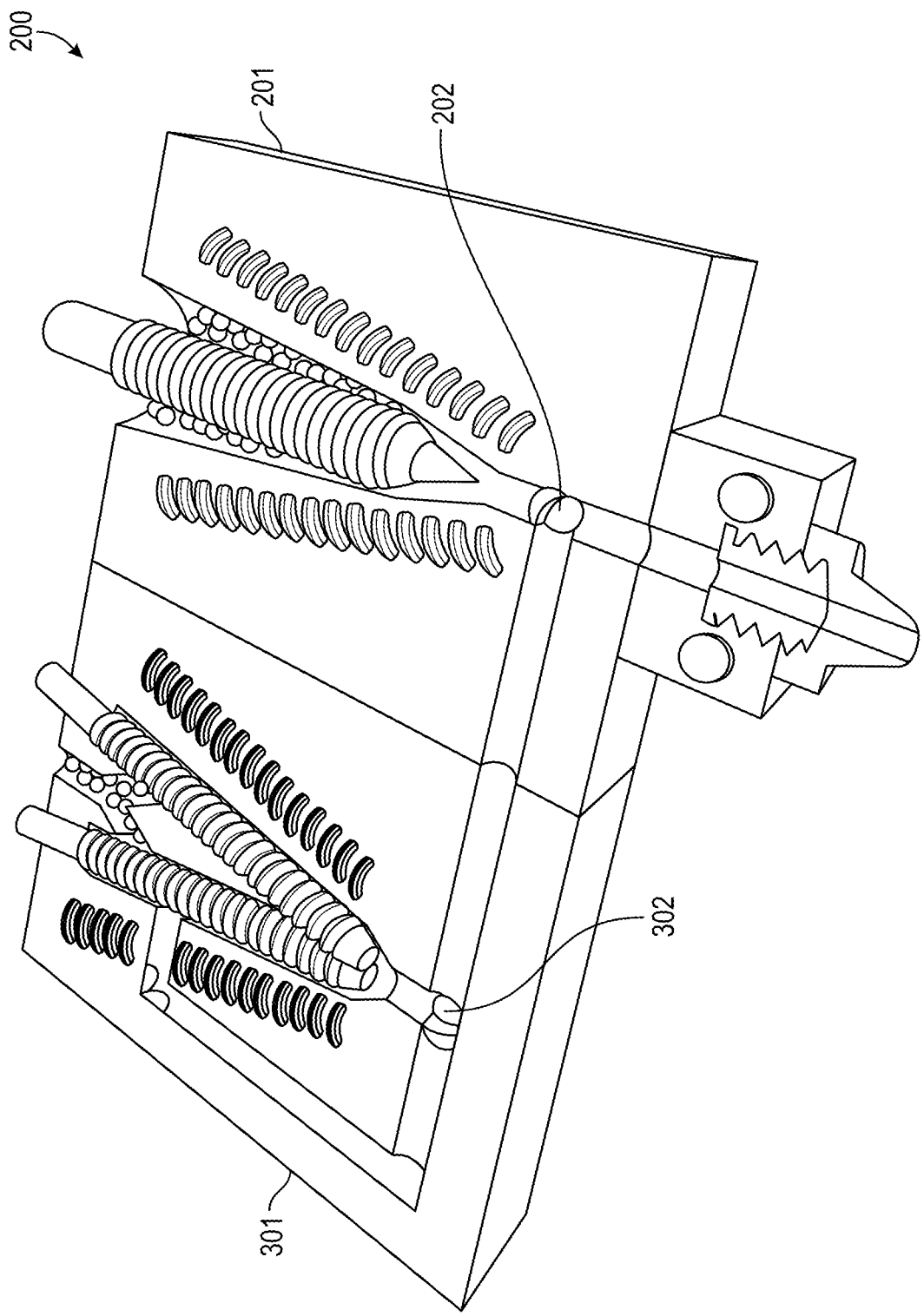
FIG. 3A shows a Smart Extrusion and Mixing Module (SEMM), according to the present invention.

The present invention discloses a Smart Extrusion and Mixing Module (SEMM) (200), which consists of two units: the main extrusion unit (MAE) (201) and the auxiliary extrusion unit (AEU) (301) as shown in FIG. 3A. This customized extruder has two modes of operation, a direct extrusion mode (DEM) and a mixing and extrusion mode. Mainly, there are two directional flow valves in the SEMM—valve 1 (202) and valve 2 (302). In an embodiment, these directional valves for controlling the flow and direction of semi-fluid material, can be rotational valves. The valve 1 (202) is in the main extrusion unit (201), and it is used to guide the flow direction of the injected materials either from the main extrusion unit or from the auxiliary unit. On the other hand, valve 2 (302) is in the auxiliary unit (301), and it controls whether the material will be circulated for mixing with the conductive powder or guiding the flow direction to the printing nozzle when the mixing process is completed. Table 1 illustrates the operational mode based on the valve status, as shown in FIG. 3A.

TABLE 1

The operational mode of Smart Extrusion and Mixing Module (SEMM) based on the valve status.

| Valve 1 | Valve 2 | Operation Mode |
| --- | --- | --- |
| Open | X | Direct Extrusion Mode through the main unit |
| Close | Close | Auxiliary unit in mixing mode, no flow is directed to the printing nozzle |
| Close | Open | Conductive material is injected from the auxiliary unit to the printing nozzle |

The AISBC examines if a layer is SNL or not. If it is an SNL, it operates the SEMM in mixing and extrusion mode, producing the required conductive printing material. Otherwise, it will run in single extrusion mode, which is the primary printing material extrusion process.

Figure 3B:
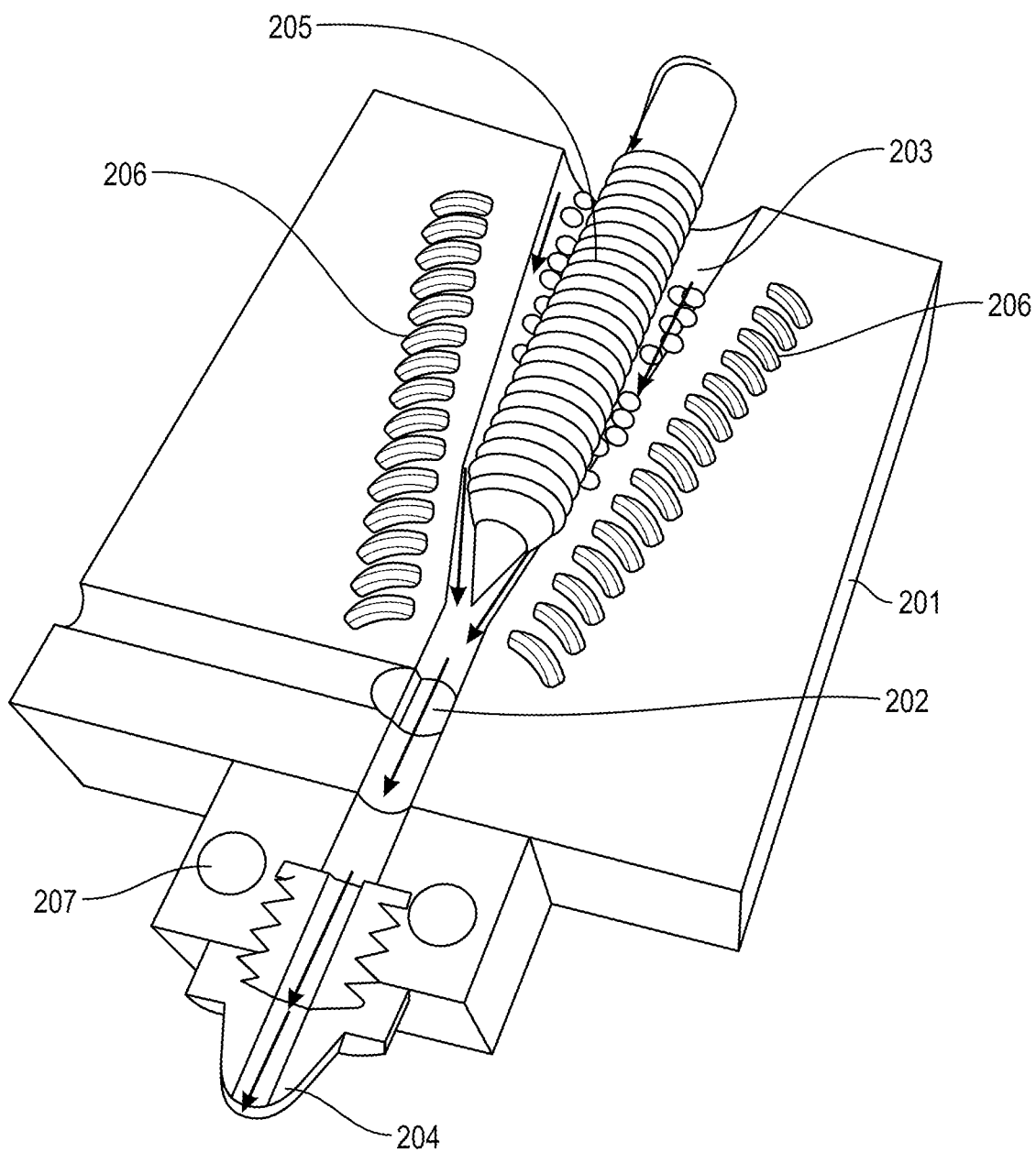
FIG. 3B shows a Main extrusion unit when valve 1 is open, in accordance with the present invention.

In an embodiment of the invention, the SEMM (200) operates in a direct extrusion mode (DEM) through the Main Extrusion Unit (MAE) (201) as shown in FIG. 3B. In this mode, directional valve 1 (202) is open to allow the raw material to be directed from the Main Extrusion Unit (MAE) (201) to the printing nozzle (204), whereas valve 2 (not shown in this figure) remains closed. The raw material or the primary printing material, in an embodiment of the invention, comprises plastic pellets in powdered form. The plastic pellets are supplied to the Main Extrusion Unit (201) via a plastic pellet feeding path (203) as shown. A main extrusion augur (205) which is set in rotation motion, conveys the fed raw material to the printing nozzle (204) via valve 1 (202), the direction of flow being indicated by arrows in the figure. The plastic pellets inside the main extrusion auger (205) are preheated by side heaters (206) provided on both sides of the main extrusion auger (205), and further heated by Extrusion heaters (207) located near the printing nozzle (204). The pellets are thermally treated so that the printing material conveyed at the printing nozzle (204) is of optimized extrusion quality. This mode is used to print the structural parts using the primary printing material.

Figure 3C:
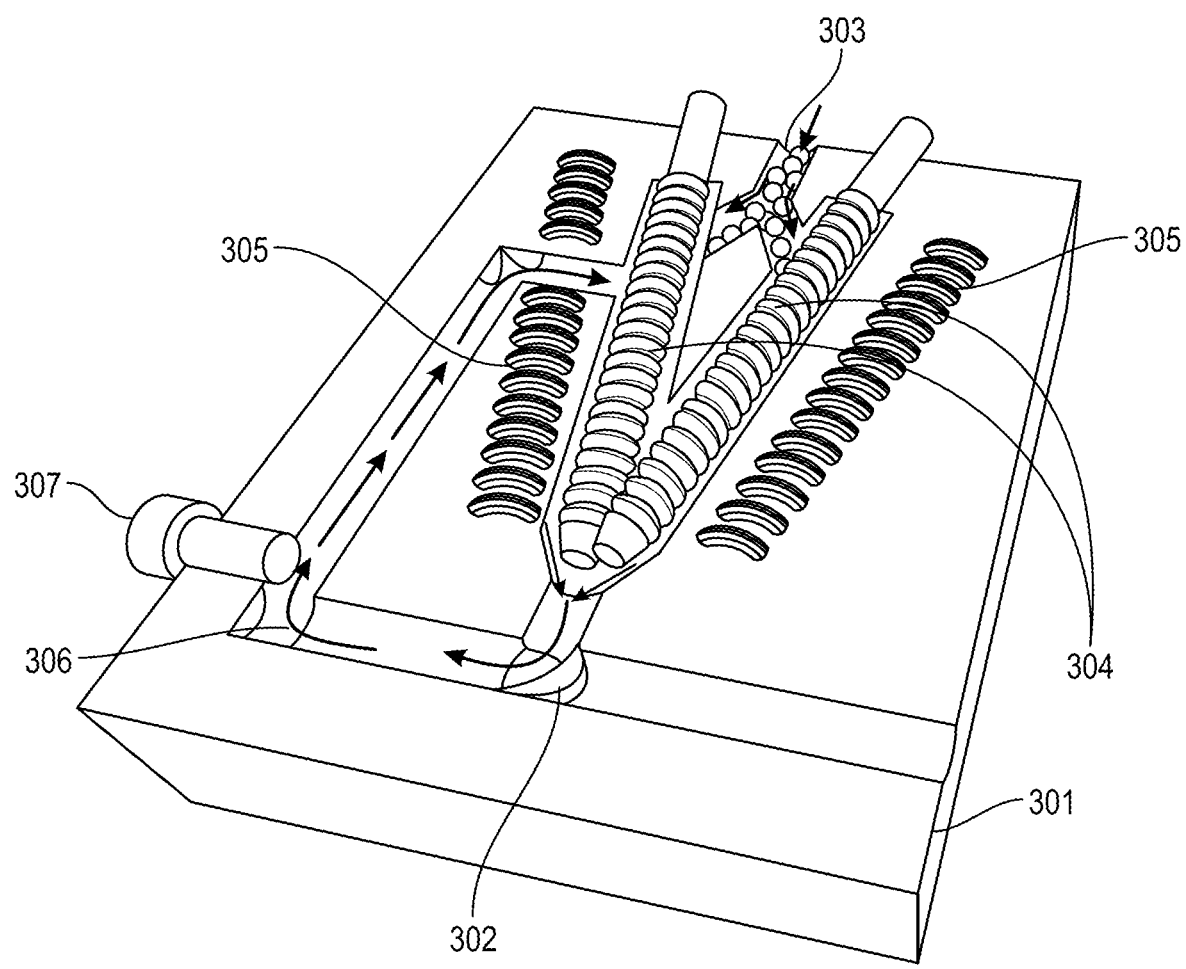
FIG. 3C depicts an auxiliary extrusion unit showing mixing process when valve 2 is closed, according to the present invention.
Figure 3D:
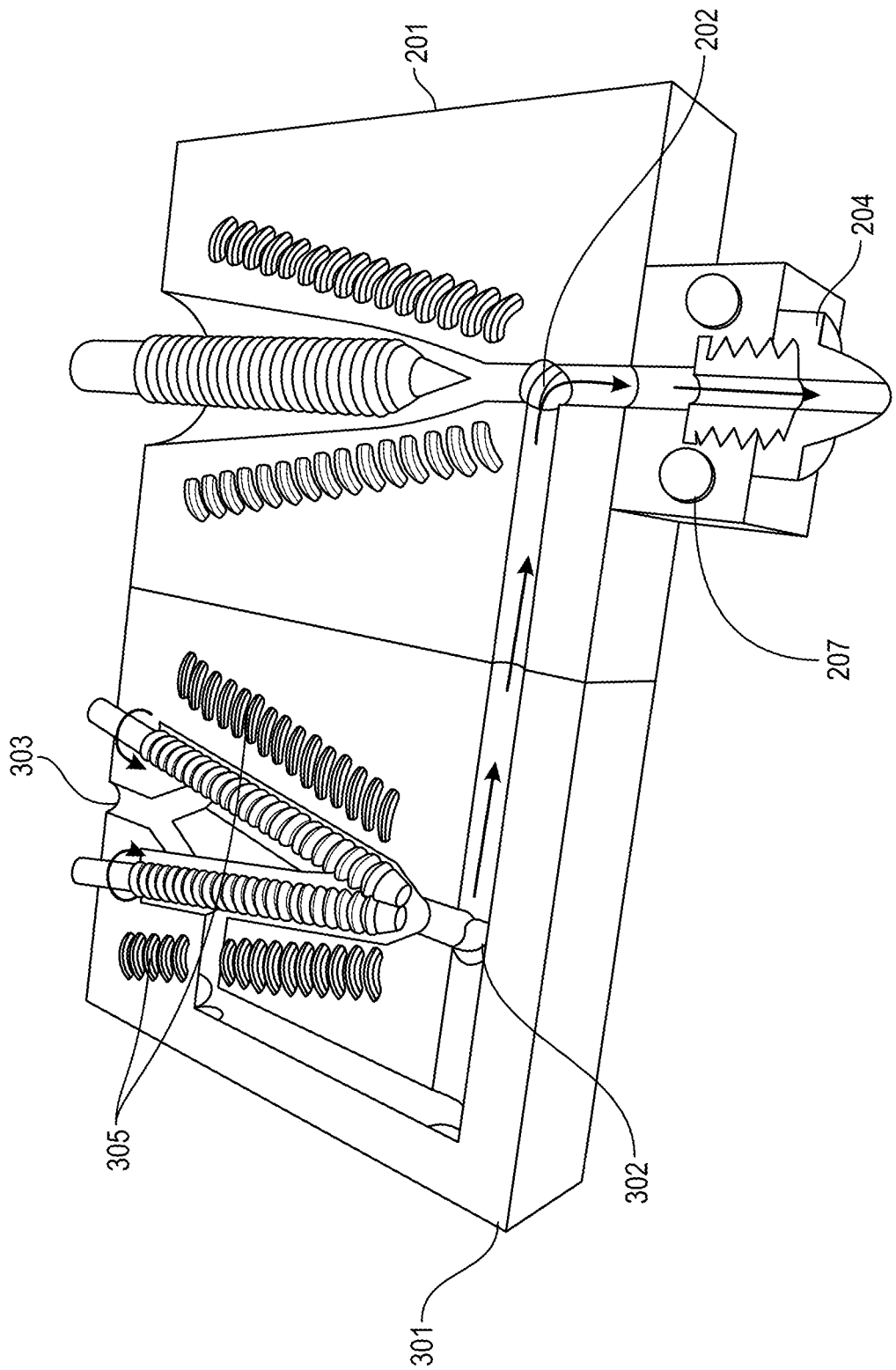
FIG. 3D depicts the Auxiliary extrusion unit showing extrusion process when valve 2 is open.

In an embodiment of the invention, the SEMM (200) operates in a mixing and extrusion mode, using the Auxiliary Extrusion Unit (AEU) (301). In this mode, the mixing process takes place in the Auxiliary Extrusion Unit (AEU) (301), when valve 2 (302) is closed, as illustrated in FIG. 3C. An injected conductive particle powder is mixed with supplied raw material to create conductive material that is used to print the sensor network layer (i.e., SNL). The nanoparticles of the conductive powder are injected/sprayed over the raw material used for printing at a consistent mixing ratio. The primary raw material in an embodiment, comprises plastic pellets in a powdered form. An estimated ratio of raw materials (plastic pellets) to the conductive powder is supplied to the inlet of the AEU (301) via a feeding path (303) as shown. Two powered extrusion augurs (304) are rotating in opposite directions for improved mixing and extrusion of the material forward. Inside the extrusion augers (304), the mixed material is preheated by side heaters (305), provided on the sides of the augers (304). The directional valve 2 (302) is initially closed when the auxiliary unit (301) is in mixing mode, directing the material back through the mixing path (306) to the augur (304) for the remixing process, to ensure quality and proper mixing. The flow through the mixing path being indicated by arrows as shown. No flow is directed to the printing nozzle. A mixing quality sensor (MQS) (307), such as a photoelectric sensor, measures parameters indicative of its mixing quality, such as the density of the color of mixed material, to determine its uniformity and sends feedback to the AISBC when a uniform mixture is achieved to indicate that the material is ready for extrusion. FIG. 3D shows the SEMM (200) operating in extrusion mode using Auxiliary Extrusion Unit (AEU) (301) and the Main Extrusion Unit (MAE) (201), when valve 2 (302) is open. The AISBC signals directional valve 2 (302) to open for extrusion when mixing process is completed and the conductive material is injected from the Auxiliary Unit (301) to the printing nozzle (204) through the Main Extrusion Unit (201) and its valve 1 (202). The direction of flow of material is being indicated by the arrows in the figure. The extruded material is further heated by Extrusion heaters (207) placed on the way to the printing nozzle (204) for heating up the material for further improving the extrusion quality.

Figure 4A:
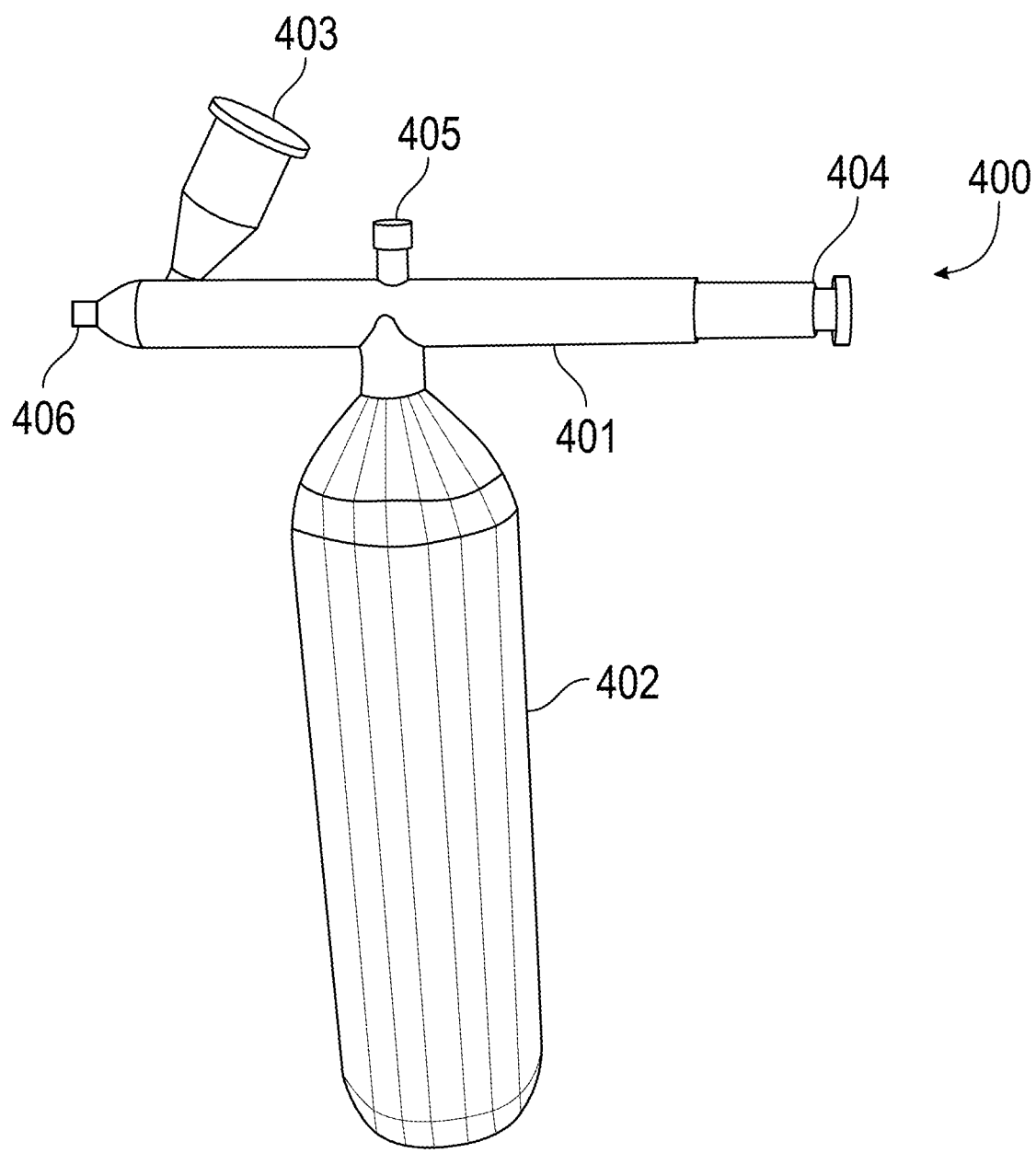
FIG. 4A shows an air injection unit that injects conductive powder to the auxiliary extrusion unit, in accordance with an embodiment of the present invention.
Figure 4B:
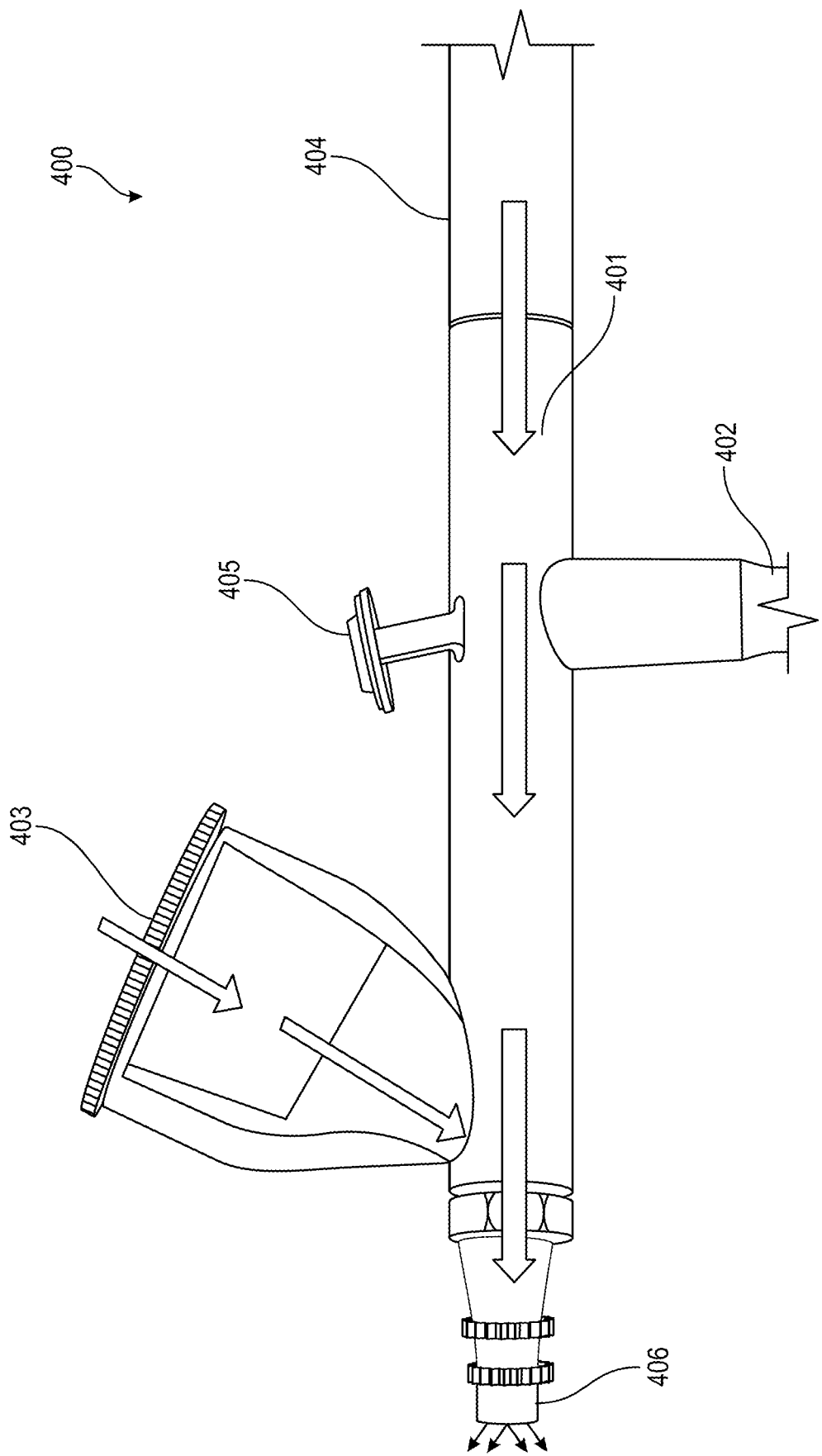
FIG. 4B is a detailed diagram for the conductive powder injection process.

In an embodiment of the invention, the conductive powder to be mixed with the primary material (such as the plastic pellets) is supplied to the inlet of the auxiliary unit during the mixing process, by an injector that works on the principle of Bernoulli's concept. FIG. 4A illustrates an air injection unit (400) that injects conductive powder to the auxiliary extrusion unit. The air injection unit (400) comprises of an injector (401), an air pump (402) and a conductive particles storage tank or container (403) for storing the conductive nanoparticles in the form of powder. The injector (401) is provided with an airflow adjusting screw (404) to control the velocity and pressure of airflow inside the injector (401) and a secondary airflow controller (405) such as a dual action trigger valve (405) to regulate the release of both the compressed air from the air pump (402) and the conductive particles into the injector (401). When the trigger is partially pressed, the dual action trigger valve (405) releases compressed air into the injector (401). When the trigger is fully pressed, it releases both compressed air and conductive particles simultaneously, allowing them to mix and spray out of the injector (401). During the injection process, the conductive particles are fed through the storage tank (403) to the injection output nozzle (406) to be sprayed over the plastic pellets. FIG. 4B depicts a detailed diagram for the powder injection process. The injection speed can be controlled by controlling airflow speed based on Bernoulli's principle. During this process, air pump (402) is activated which draws in ambient air and compresses it to a higher pressure. The air pressure inside the pump is regulated by an airflow controller (405), which can be a dual action trigger valve. As the air pressure inside the pump (402) goes beyond a specified level, the valve (405) opens to let the air into the injector (401). The valve (405) is engineered to create a high-velocity air stream with a low-pressure zone just beyond its opening on the injector side, based on Bernoulli's principle. This low-pressure zone inside the injector (401) effectively draws the conductive particles from the storage tank (403) into the high velocity air stream. The mixture of air and conductive particles exits the output nozzle (406) of the injector and is sprayed over the surface of the plastic pellets, coating them uniformly. These pellets are preheated to a specified temperature for a consistent coating ratio of conductive particles over the pellets surface. A consistent coating ratio is significant for maintaining a controllable and consistent mixing ratio that could be used in the auxiliary unit to produce uniform conductive material from these pellets coated with conductive powder as the raw material. The consistent mixing ratio leads to controlled conductive properties of the so produced conductive material.

Figure 5:
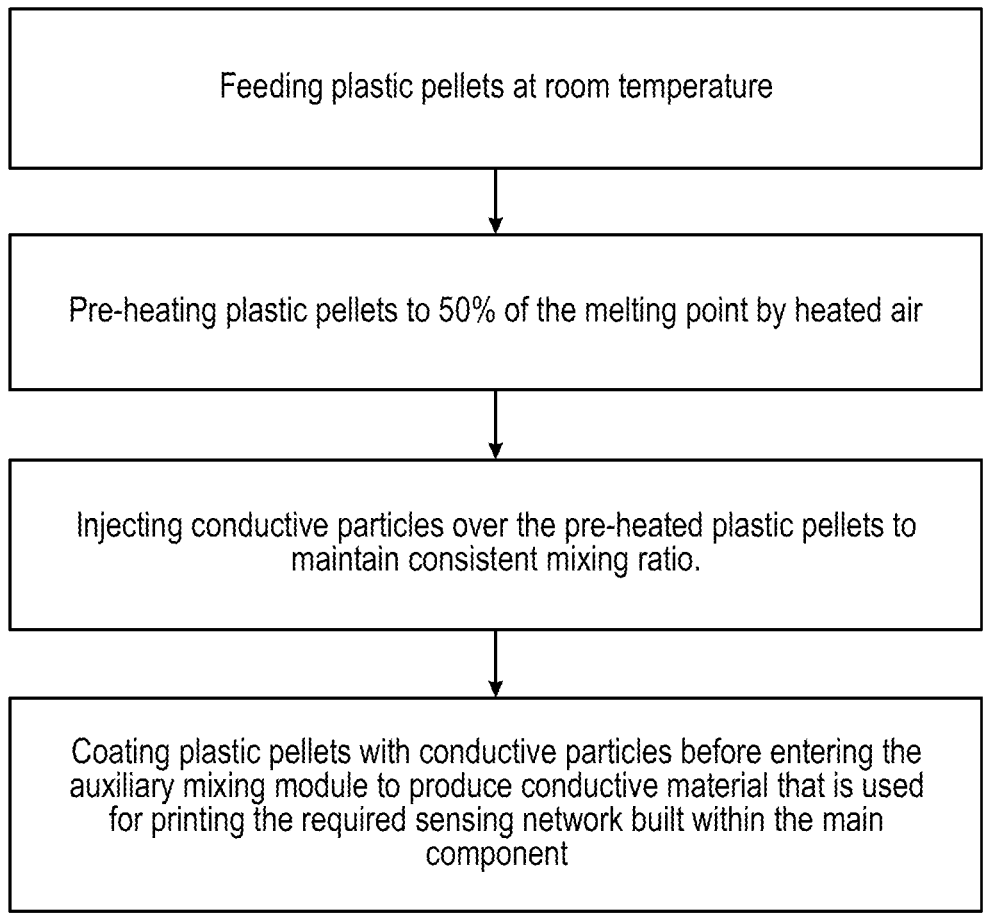
FIG. 5 shows plastic pellets coating process flow to maintain consistent mixing ratio, according to the present invention.

FIG. 5 represents the process flow for coating the plastic pellets with conductive powder particles to maintain a consistent mixing ratio. The coating process for the supplied plastic pellets is achieved through pre-heating the pellets with identified hot air temperature to optimize the coating of the conductive particles that cover the entire surface of the pellets. This helps in maintaining a consistent ratio of the injected particles that would result in controllable quality of the mixing process which will be reflected in the quality of the sensing network. The coating process comprises feeding the raw material or plastic pellets at room temperature, pre-heating plastic pellets to 50% of the melting point by supplied hot air, injecting conductive particles over the pre-heated plastic pellets to maintain consistent mixing ratio, coating plastic pellets with conductive particles before entering the auxiliary mixing module to produce conductive material. The conductive material, so produced by the auxiliary unit is used for printing the required sensing network built within the main component.

Figure 6:
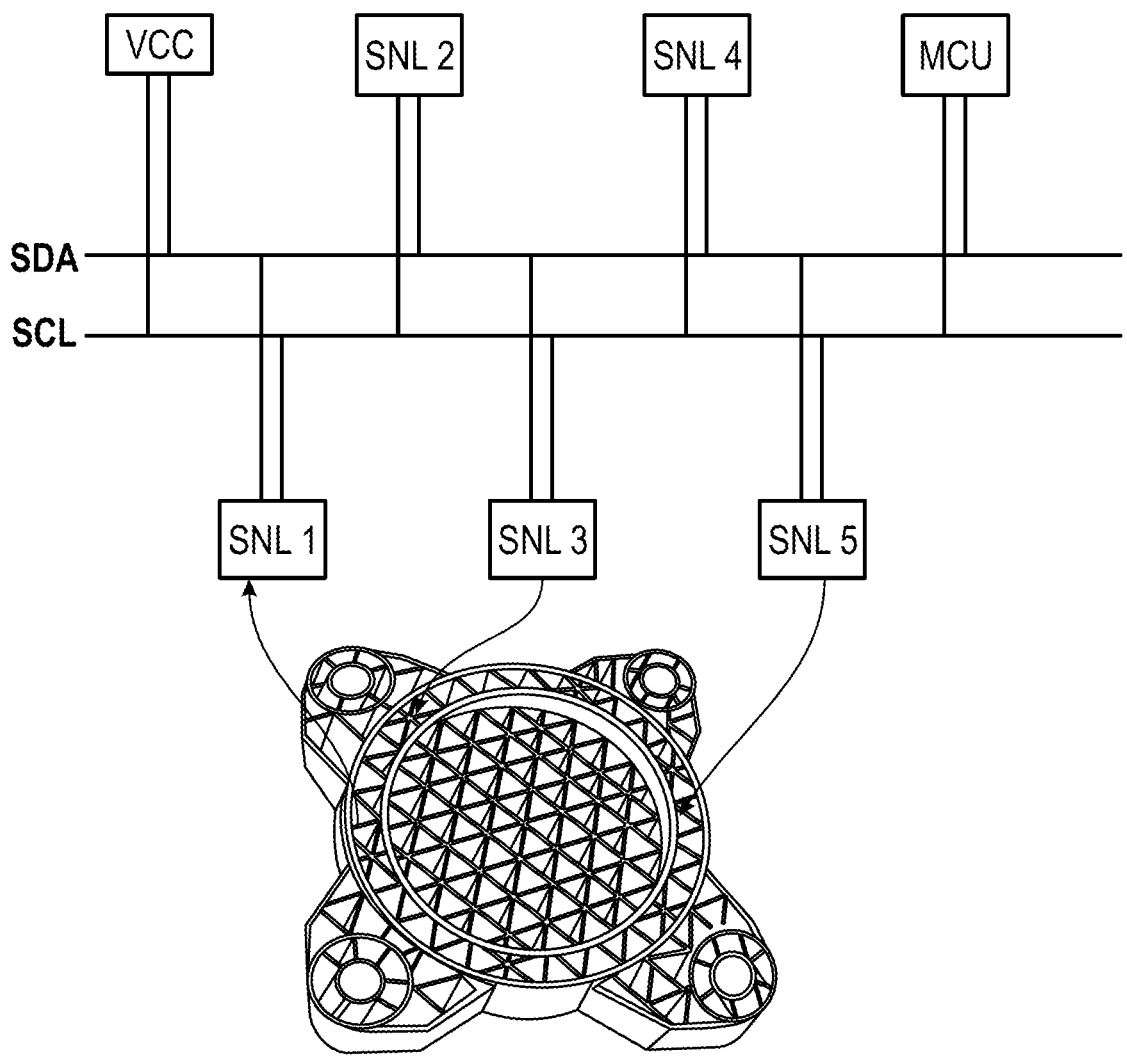
FIG. 6 shows a network connection diagram illustrating SNL communication bus.

According to the proposed invention, an array of smart sensors is 3D printed and embedded during component manufacturing into critical locations, as determined by FEA. In an embodiment of the invention, the sensor network layers are connected using an Inter-Integrated Circuit (I2C) communication protocol where all layers are connected to a 2-wire bus to form a sensor network array. Each SNL has a unique identification ID. The communication with the SNL layers is managed by AISBC. FIG. 6 shows the network connection diagram illustrating SNL communication bus. These networks provide real-time health monitoring data that could be further processed and analysed to provide actual real-time conditions of the component while in use.

In an embodiment of the invention, the proposed system integrates a scanning module and Machine Learning (ML) algorithms for enhancing quality control in additive manufacturing. Each printed SNL layer is scanned and documented by a scanning camera comprising a structural light scanning camera and leveraged ML algorithms are further applied for rapidly detecting and addressing defects and irregularities in real-time. Performing layer by layer defect recognition ensures that all layers are printed correctly and can be used for certification and validation purposes. This real-time monitoring system represents a significant advancement, offering unique accuracy and efficiency in quality assurance. The quality and integrity of the manufactured component is thereby ensured throughout the printing process.

In an embodiment of the proposed invention, the manufactured component is provided with an edge Artificial Intelligence embedded system, that operates in conjunction with the SNL layers in the post-processing stage, as a real-time monitoring and integrity diagnosis system. The purpose of providing an AI embedded system is to help in diagnosing and predicting potential failures or risks associated with the structural components using the AI-driven analysis and providing real-time feedback and alerts to the operators or the maintenance team. The AI system functions by collecting data from the SNL layers embedded within the structures and components, processing the collected data, and applying a custom ML model to analyse the data and detect abnormalities or signs of potential issues with the structural components based on the continuous data stream from the SNL layers. As disclosed herein, smart slicing method embeds SNL layers into a component at its pre-defined critical locations during the manufacturing process. Real-time monitoring capabilities are thereby directly integrated into the fabrication process. The strategic placement of SNL layers within the structural components allows for continuous monitoring of key performance metrics, such as stress, strain, and temperature, ensuring early detection of abnormalities or potential failure points during manufacturing. Furthermore, by seamlessly integrating sensing network layers into the additive manufacturing process, the smart slicing also eliminates the need for additional assembly steps or post-processing. Sensing network layers being embedded into critical locations of the sliced model, the proposed methodology enhances functionality, reliability, and efficiency of the main component, and sets a new standard for real-time monitoring and quality assurance in additive manufacturing processes.

Figure 7:
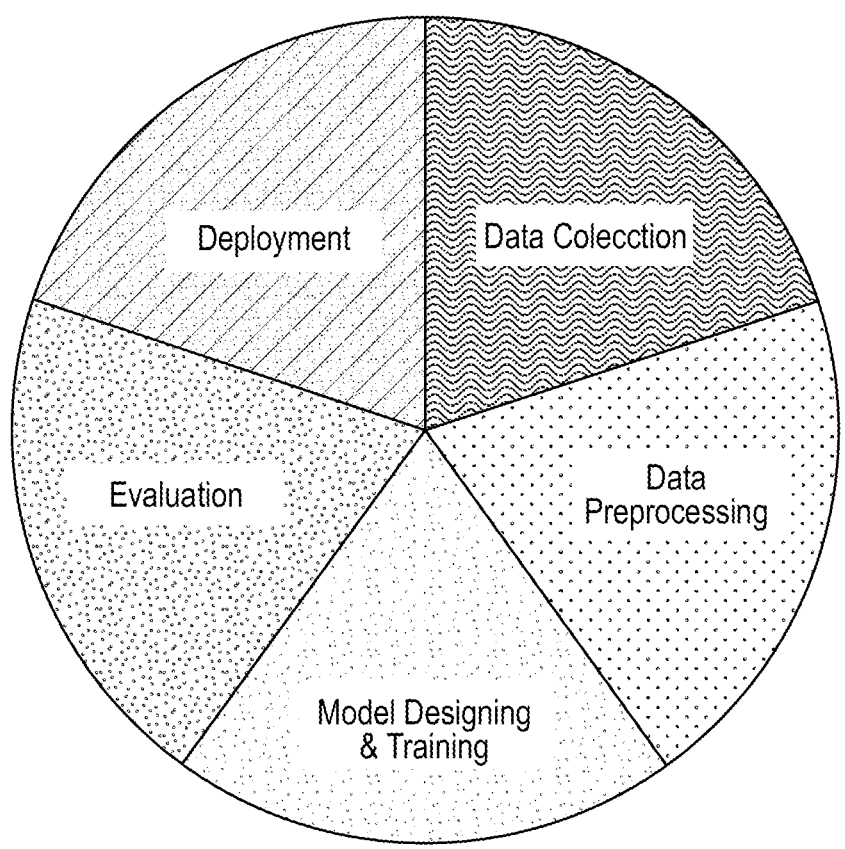
FIG. 7 shows ML algorithm design phases.

During the post-processing stage, the data from all sensor network layers transmitted through the I2C bus as shown in FIG. 6, are accumulated, and processed at the edge Artificial Intelligence embedded system. The data is used as an input dataset for the Machine Learnings (ML) algorithm for detecting defects or abnormalities and generating alerts and real-time feedback. A custom Machine Learning (ML) model has been trained using AI development platform to scan each printed layer for abnormalities using image classification. The ML algorithm design phases are depicted in FIG. 7, comprising Data Collection, Data Preprocessing, Model Designing & Training, Evaluation and Deployment. The steps for designing the ML algorithm model involves training data collection as a training dataset to be used for training the model using supervised learning and testing dataset for validation. The dataset images are resized for optimized accuracy. A preprocessing algorithm using digital signal processing (DSP) has been applied to extract patterns (features) from the collected images, then the images are normalized. These processed and normalized images act as an input to Transfer Learning Neural Network algorithm (such as Google MobileNetV2) for designing and training the custom model. After validation and testing, the evaluated model is deployed to the AISBC for layer-by-layer defect recognition of printed layers, ensuring all layers are printed correctly during manufacturing. The ML model is also employed in the edge AI embedded system, for real-time condition monitoring and defect or potential risk diagnosis of the main component during its operation/use. In an embodiment of the invention, AI embedded system is an Artificial Intelligence-based smart structural stresses health monitoring module. The module can be embedded within the main component or provided as an external module, in continuous communication with the component.

Figure 8:
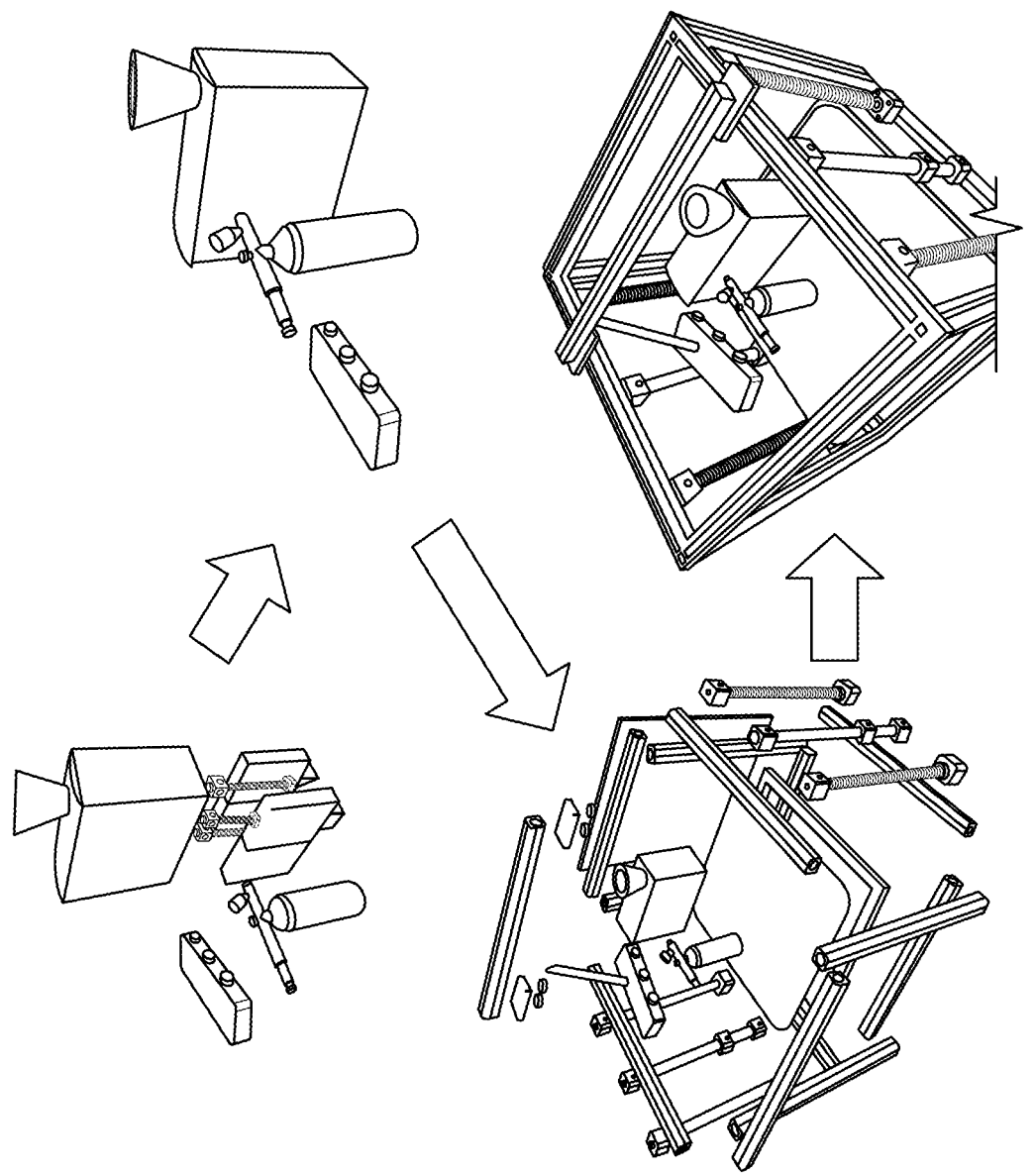
FIG. 8 shows modular integrated with a multi-axis system to upgrade the production process, in accordance with the present invention.

The present invention, in an embodiment, also provides for the proposed system integration with a conventional Multi-Axis Motion System wherein, the modular disclosed herein is integrated easily with any existing multi-axis system and even with 3D printing infrastructure of any scale, as shown in FIG. 8. This would save time, effort, and cost since it avoids constructing new infrastructure to implement the concept, while at the same time it upgrades the existing production process. According to this embodiment, an assembled Multi-Axis motion system has a smart extrusion and mixing module as well as a conductive powder spraying module integrated with the said system. The plastic pellets are fed to the extrusion module by means of a flexible hose connected with the extrusion module, enabling continuous feeding of the raw material while printing. The Multi-Axis system is also integrated with structural light scanning camera that performs layer by layer defect recognition of printed SNL for the certification and validation purposes. In another embodiment, the production of the smart sensing network is simulated before the actual production process to ensure the designed stages. Smart slicing is implemented to produce the sensing networks for actual 3D printed components, which is the final product.

Benefits of the proposed real-time monitoring industrial integrity diagnosis system and the method of embedding such systems into components during manufacture, in accordance with the present invention include introducing sustainable practices in manufacturing, that can lead to significant cost savings. This is achieved through various means, such as reducing energy consumption, minimizing material waste, optimizing production processes, lowering operational and overhead costs and decreasing greenhouse gas emissions, for a reduced carbon footprint. The invention promotes the development of innovative and more sustainable technologies and products adaptable to specific industries and safety requirements. It doesn't require a complete replacement of manufacturing infrastructure since the existing facilities can be upgraded to incorporate our system for more efficiency and eco-friendly. This approach is cost-effective and reduces the environmental impact associated with establishing new facilities from scratch. Environmental depreciation impact is also reduced by converting the existing systems more efficiently and reducing waste, resource depletion and pollution. This is important in the growing concerns about climate change and resource depletion. The invention proposes a modular system composed of sub-systems that can be replaced, developed, and maintained easily. The need for skilled labor is also reduced, saving additional costs. Besides, the system can be implemented within 12 months and it facilitates upgrading the conventional systems at any production scale to an advanced manufacturing system easily and simply without affecting the original functions. This can result in significant improvement in the components lifetime, safety, and reliability. The prospects of the proposed system and method is futuristic for industrial development and technology transfer, especially in the aerospace industry, as it enhances their competitiveness, encourages innovation and advanced technology adoption.

The invention finds it application in various industrial sectors, and is of utmost significant for aerospace and spacecraft industry, where high safety standards and zero-defect tolerance are paramount. Any failure can have catastrophic consequences and the invention reduces the risk of mission failure and safety breaches by continuously monitoring and addressing potential issues before they become critical. Developing aerospace components with embedded real-time condition monitoring and AI analysis represents a substantial enhancement in safety and reliability within the aerospace and space exploration industries. It offers a path to more excellent safety and has the potential for cost savings by reducing the need for unplanned maintenance and operational downtime. This innovation aligns with the uncompromising demands of space missions, where mission success and safety are paramount. It combines real-time intelligence with advanced preventive maintenance for a safer and more efficient aerospace technology. The development of an aerospace manufacturing technique capable of assessing structural conditions is a pivotal advancement in the aerospace industry. It brings forth numerous advantages in terms of sustainability, safety, and environmental impact, while simultaneously addressing the stringent manufacturing standards indispensable in the aerospace sector. This innovative manufacturing technique significantly alters the industry's approach to the operational lifespan of its structures and components through the utilization of 3D Printing technology. By providing the ability to assess the condition of these components, it instills confidence in their prolonged functional use and in turn, profoundly impacts both sustainability and safety. Regarding sustainability, the ability to prolong the operational lifespan of aerospace structures and components reduces the necessity for premature replacements and the disposal of scrapped aerospace materials, thereby diminishing the industry's environmental footprint. This reduction in waste and resource consumption aligns with global endeavors to mitigate environmental degradation and foster sustainable practices, particularly leveraging optimization software and revolutionary 3D Printing technology.

Furthermore, enhancing safety is a top priority in the aerospace industry, given the risks involved. The incorporation of a system capable of assessing structural conditions constitutes a significant stride in this direction. It aids in preempting potential failures by identifying issues before they escalate to critical levels. Such proactive measures not only safeguard operational safety but also reinforces the integrity of aerospace structures and components, ultimately contributing to a safer industry. Compliance with strict manufacturing standards is non-negotiable in the aerospace sector, where precision and reliability are imperative. In this context, integrating an AI system that analyzes each manufacturing process represents a commitment to maintaining and exceeding these standards. This ensures that every aerospace component produced using this inventive technique adheres to the industry's rigorous quality and safety requirements. The aerospace manufacturing approach outlined herein offers presents a comprehensive solution to the aerospace industry challenges. It extends the operational lifetime of structures and components while significantly reducing environmental impact by minimizing the disposal of scrapped aerospace materials. Moreover, it prioritizes safety by proactively identifying and remedying issues, thereby contributing to the industry's high standards for safety and quality. This disclosed invention showcases a comprehensive approach to advancing aerospace manufacturing while promoting sustainability and safety.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A method for additive manufacturing of a component under real-time monitoring capabilities, comprising:
   integrating smart sensor network layers (SNL) directly into sliced layers of a 3-D model of the component at predefined critical points; producing both a primary printing material and a conductive material for the SNL layers during a printing process using a Smart Extrusion and Mixing Module (SEMM); and scanning each printed layer to detect and address defects and irregularities in real-time during manufacturing, wherein
   producing the conductive material for printing the SNL layers comprises pre-heating plastic pellets to a specified temperature, coating the heated pellets with conductive particles at a consistent coating ratio for an optimized coverage of the conductive particles over the pellets, and further mixing these coated pellets uniformly in the SEMM.

2. The method of claim 1, further comprising conducting detailed structural analyses of the 3-D model of the component using Finite Element Analysis (FEA) to identify the critical points, vulnerable to high stresses and potential failure, when the component is in actual operation.

3. The method of claim 1, further comprising configuring an Artificial Intelligence Single Board Computer (AISBC) to oversee and manage the printing process and communication with the SNL layers.

4. The method of claim 3, wherein the AISBC examines if a layer to be printed is the SNL or not, during the printing process.

5. The method of claim 4, wherein the SEMM operates in a mixing and extrusion mode, to produce the conductive material for printing a layer, if the AISBC identifies the layer to be the SNL.

6. The method of claim 5, wherein the SEMM checks for the uniformity of the conductive material produced by mixing of the pre-heated plastic pellets coated with the conductive particles, using mixing quality sensors.

7. The method of claim 4, wherein the SEMM operates in a direct or single extrusion mode, to produce the primary material for printing a layer, if the AISBC identifies the layer not to be the SNL.

8. The method of claim 1, wherein the plastic pellets are pre-heated by hot air to 50% of its melting point to ensure that the conductive particles are coated over the pellets surface to maintain a consistent mixing ratio when being mixed in the SEMM for producing the conductive material.

9. The method of claim 1, wherein the scanning the printed layers comprises scanning by a structural scanning camera and applying a trained Machine Learning (ML) algorithm to detect irregularities or defects, ensuring all layers are printed correctly.

10. The method of claim 1, further comprising integrating the method with an existing multi-axis motion system or a 3-D printing infrastructure of any scale, without replacing these systems.

11. A system for additive manufacturing of a component under real-time monitoring capabilities, comprising:
    a smart slicer configured for embedding smart sensor network layers (SNL) directly into sliced layers of a 3-D model of the component at predefined critical points;
    a Smart Extrusion and Mixing Module (SEMM) configured to produce both a primary printing material and a conductive material for the SNL layers during a printing process; and a scanning module for scanning each printed layer to detect and address defects and irregularities in real-time during manufacturing, wherein
    an injection system is configured for coating plastic pellets which are pre-heated to a specified temperature, with conductive particles at a consistent ratio for an optimized coverage of conductive particles over the pellets and, wherein
    the SEMM is configured for uniformly mixing the pellets coated with conductive particles to produce the conductive material used for printing the SNL layers.

12. The system of claim 11, wherein a Finite Element Analysis (FEA) is conducted on the 3-D model of the component prior to smart slicing, for identifying the critical points, vulnerable to high stresses and potential failure, when the component is in actual operation.

13. The system of claim 11, further comprising an Artificial Intelligence Single Board Computer (AISBC) configured to oversee and manage the printing process and communication with the SNL layers.

14. The system of claim 13, wherein AISBC is further configured to examine if a layer to be printed is the SNL or not, during the printing process.

15. The system of claim 14, wherein the SEMM further comprising a main extrusion unit (MAE) for extruding the primary printing material when the SEMM operates in a direct extrusion mode (DEM) and an auxiliary extrusion unit (AEU) for mixing and extruding the conductive material when the SEMM operates in a mixing and extrusion mode.

16. The system of claim 15, wherein the SEMM operates in the mixing and extrusion mode, to produce the conductive material for printing a layer, if the AISBC identifies the layer to be the SNL.

17. The system of claim 16, wherein the SEMM is provided with mixing quality sensors for monitoring the uniformity of the conductive material produced by mixing of the pre-heated plastic pellets coated with the conductive particles in the auxiliary extrusion unit (AEU).

18. The system of claim 15, wherein the SEMM operates in the direct extrusion mode, to produce the primary material for printing a layer, if the AISBC identifies the layer not to be the SNL.

19. The system of claim 11, wherein the scanning module further comprises a structural light scanning camera and a trained Machine Learning (ML) algorithm to detect irregularities or defects, for printing all layers correctly.

20. The system of claim 11, wherein the injection system comprises an injector for spraying the conductive particles on to the plastic pellets, the pellets being pre-heated to 50% of its melting point to ensure that the conductive particles are coated over the pellets surface to maintain a consistent mixing ratio when being mixed in the auxiliary extrusion unit.

* * * * *